(12) United States Patent
Wada et al.

(10) Patent No.: US 12,152,727 B2
(45) Date of Patent: Nov. 26, 2024

(54) OIL TEMPERATURE ESTIMATION APPARATUS AND OIL TEMPERATURE ESTIMATION METHOD

(71) Applicant: SUBARU CORPORATION, Tokyo (JP)

(72) Inventors: Ryusei Wada, Tokyo (JP); Taishi Kobayashi, Tokyo (JP); Junji Harada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/200,176

(22) Filed: May 22, 2023

(65) Prior Publication Data

US 2023/0383905 A1 Nov. 30, 2023

(30) Foreign Application Priority Data

May 31, 2022 (JP) .................................. 2022-088438

(51) Int. Cl.
*F16N 29/00* (2006.01)
*F16H 59/44* (2006.01)
*F16H 59/64* (2006.01)
*F16H 59/74* (2006.01)

(52) U.S. Cl.
CPC ............. *F16N 29/00* (2013.01); *F16H 59/44* (2013.01); *F16H 59/64* (2013.01); *F16H 59/74* (2013.01); *F16N 2210/04* (2013.01); *F16N 2250/11* (2013.01)

(58) Field of Classification Search
CPC .. F16N 29/00; F16N 2210/04; F16N 2250/11; F16H 59/44; F16H 59/64; F16H 59/74
See application file for complete search history.

(56) References Cited

FOREIGN PATENT DOCUMENTS

| JP | 2004138468 | A | * | 5/2004 |
| JP | 2010196851 | A | * | 9/2010 |
| JP | 2010276074 | A | * | 12/2010 |
| JP | 2019-138357 | A |   | 8/2019 |

* cited by examiner

*Primary Examiner* — Justin Holmes
(74) *Attorney, Agent, or Firm* — TROUTMAN PEPPER HAMILTON SANDERS LLP (57) ABSTRACT

An oil temperature estimation apparatus that estimates an oil temperature of a driving system of a vehicle includes a vehicle speed sensor, a saturated oil temperature acquirer, an oil temperature deviation acquirer, an oil temperature feedback value acquirer, and an estimated oil temperature acquirer. The saturated oil temperature acquirer acquires a saturated oil temperature in a running state of the vehicle at least including a vehicle speed based on the running state. The oil temperature deviation acquirer acquires an oil temperature deviation between the saturated oil temperature and an estimated oil temperature previous value. The oil temperature feedback value acquirer acquires an oil temperature feedback value based on the oil temperature deviation and the vehicle speed. The estimated oil temperature acquirer acquires an estimated oil temperature current value based on the estimated oil temperature previous value and the oil temperature feedback value.

9 Claims, 5 Drawing Sheets

| OUTSIDE AIR TEMPERATURE (°C) | ⇐ LOW              HIGH ⇒ |
|---|---|
| ESTIMATED OIL TEMPERATURE INITIAL VALUE (°C) | .  .  .  .  .  .  .  .  .  .  .  . |

OIL TEMPERATURE ESTIMATION APPARATUS AND OIL TEMPERATURE ESTIMATION METHOD

CROSS-REFERENCE TO RELATED APPLICATION

The present application claims priority from Japanese Patent Application No. 2022-088438 filed on May 31, 2022, the entire contents of which are hereby incorporated by reference.

BACKGROUND

The disclosure relates to oil temperature estimation apparatuses and oil temperature estimation methods. In particular, the disclosure relates to an oil temperature estimation apparatus and an oil temperature estimation method, which estimate the oil temperature of a driving system of a vehicle.

For example, driving force generated in an engine or the like of a vehicle is converted by a transmission and, then, is transmitted to the driving wheels of the vehicle via differentials. When the vehicle runs for a long time in an environment of high outside air temperature or high engine load, the temperature (oil temperature) of oil used for a driving system including the transmission and the differentials is increased. If the oil temperature of the driving system (including the transmission and the differentials) is increased to exceed the durable temperature of the components, there is room for improvement in that the reliability of the components may be degraded (for example, early deterioration of the components may be caused).

In particular, the temperature of hypoid gears composing the differentials is greatly increased due to heat generated in a gear slider and is likely to be increased to a high value if the high-load operating state is continuously continued. Increase in temperature of the oil, which is caused by the increase in temperature of the differentials, causes decrease in viscosity of the oil to cause oil film breakage. As a result, abnormal wear and/or scoring of a gear tooth surface may occur and there is room for improvement in that reduction in lubrication performance, which is caused by the early deterioration of the oil, and decrease in lifetime, which is caused by deterioration of resin and rubber components due to high temperature, may be caused.

In order to prevent overheat of the driving system (including the transmission and the differentials) (and reduction in the reliability of the components), a technique is known in which an oil temperature sensor for monitoring (detecting) the oil temperature of the driving system is provided and, if the oil temperature exceeds a predetermined temperature (a predetermined threshold value) (that is, at high temperature), for example, the output from the engine is restricted (regulated) to decrease the vehicle speed (for example, refer to Japanese Unexamined Patent Application Publication (JP-A) No. 2019-138357).

JP-A No. 2019-138357 discloses a technique in which further increase in oil temperature is suppressed by performing high oil temperature control to decrease the rotation speed of the engine to decrease the driving force if an actual oil temperature Tn detected by the oil temperature sensor is higher than or equal to a predetermined value T1 in order to protect the automatic transmission.

In addition, in the technique disclosed in JP-A No. 2019-138357, after abnormality of the oil temperature sensor is determined, the high oil temperature control to protect the automatic transmission is performed if a calculated oil temperature Tc of the automatic transmission is higher than or equal to a predetermined value. The calculated oil temperature Tc of the automatic transmission is calculated based on an amount-of-heat radiation Tr of the automatic transmission after the abnormality is determined, an amount-of-heat-generation Tg of the automatic transmission after the abnormality is determined, and the latest actual oil temperature Tn, among the actual oil temperatures determined to be normal.

SUMMARY

An aspect of the disclosure provides an oil temperature estimation apparatus configured to estimate an oil temperature of a driving system of a vehicle. The oil temperature estimation apparatus includes: a vehicle speed sensor configured to detect a vehicle speed of the vehicle; a saturated oil temperature acquirer configured to acquire a saturated oil temperature in a running state of the vehicle based on the running state, the running state at least including the vehicle speed; an oil temperature deviation acquirer configured to acquire an oil temperature deviation between the saturated oil temperature and an estimated oil temperature previous value, the estimated oil temperature previous value including a last value of the estimated oil temperature; an oil temperature feedback value acquirer configured to acquire an oil temperature feedback value based on the oil temperature deviation and the vehicle speed; and an estimated oil temperature acquirer configured to acquire an estimated oil temperature current value based on the estimated oil temperature previous value and the oil temperature feedback value, the estimated oil temperature current value including a current value of the estimated oil temperature that is estimated one time after the last value of the estimated oil temperature.

An aspect of the disclosure provides an oil temperature estimation method of estimating an oil temperature of a driving system of a vehicle. The oil temperature estimation method includes: detecting an outside air temperature using with an outside air temperature sensor; detecting a vehicle speed of the vehicle with a vehicle speed sensor; acquiring a saturated oil temperature based on the outside air temperature and the vehicle speed; acquiring an oil temperature deviation between the saturated oil temperature and an estimated oil temperature previous value, the estimated oil temperature previous value including a last value of the estimated oil temperature; acquiring an oil temperature feedback value based on the oil temperature deviation and the vehicle speed; and acquiring an estimated oil temperature current value based on the estimated oil temperature previous value and the oil temperature feedback value, the estimated oil temperature current value including a current value of the estimated oil temperature that is estimated one time after the last value of the estimated oil temperature.

An aspect of the disclosure provides an oil temperature estimation apparatus configured to estimate an oil temperature of a driving system of a vehicle. The oil temperature estimation apparatus includes a vehicle speed sensor configured to detect a vehicle speed of the vehicle, and circuitry. The circuitry is configured to: acquire a saturated oil temperature in a running state of the vehicle at least including the vehicle speed based on the running state, the running state at least including the vehicle speed; acquire an oil temperature deviation between the saturated oil temperature and an estimated oil temperature previous value, the estimated oil temperature previous value including a last value of the estimated oil temperature; acquire an oil temperature feedback value based on the oil temperature deviation and the vehicle speed; and acquire an estimated oil temperature current value based on the estimated oil temperature previous value and the oil temperature feedback value, the estimated oil temperature current value including a current value of the estimated oil temperature that is estimated one time after the last value of the estimated oil temperature.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

As described above, in the technique disclosed in JP-A No. 2019-138357, the high oil temperature control is performed using the detected value (the actual oil temperature) detected by the oil temperature sensor during the normal operation of the oil temperature sensor while the high oil temperature control is performed by estimating the oil temperature (the calculated oil temperature) based on the last detected value (the actual oil temperature) when the oil temperature sensor is normal during the abnormal operation of the oil temperature sensor. In other words, the technique disclosed in JP-A No. 2019-138357 assumes that the oil temperature sensor is provided and a case in which the oil temperature sensor is not provided is not considered. Accordingly, it is not possible to perform the high oil temperature control if the oil temperature sensor for detecting the oil temperature is not provided. In addition, it is also not possible to estimate the oil temperature if the oil temperature sensor is not provided (if the value detected when the oil temperature sensor normally functions does not exist).

Furthermore, it is not possible to estimate the accurate oil temperature with the technique disclosed in JP-A No. 2019-138357 if abnormality occurs in the oil temperature sensor during parking or if the oil temperature is shifted from the last detected value (the actual oil temperature) when the oil temperature sensor is normal, for example, if the vehicle (engine) is stopped after abnormality occurs in the oil temperature sensor and the vehicle starts to run again after the actual oil temperature is decreased.

In contrast, there is a case in which the oil temperature sensor is not capable of being mounted due to restrictions on the structure or the layout. Newly adding the oil temperature sensor or the like leads increase in cost, increase in the number of steps, and so on. Accordingly, a technique is to be developed to estimate the oil temperature without using (providing) the oil temperature sensor for detecting the oil temperature.

It is desirable to provide an oil temperature estimation apparatus and an oil temperature estimation method, which are capable of estimating the oil temperature of a driving system without using (providing) the oil temperature sensor for detecting the oil temperature.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
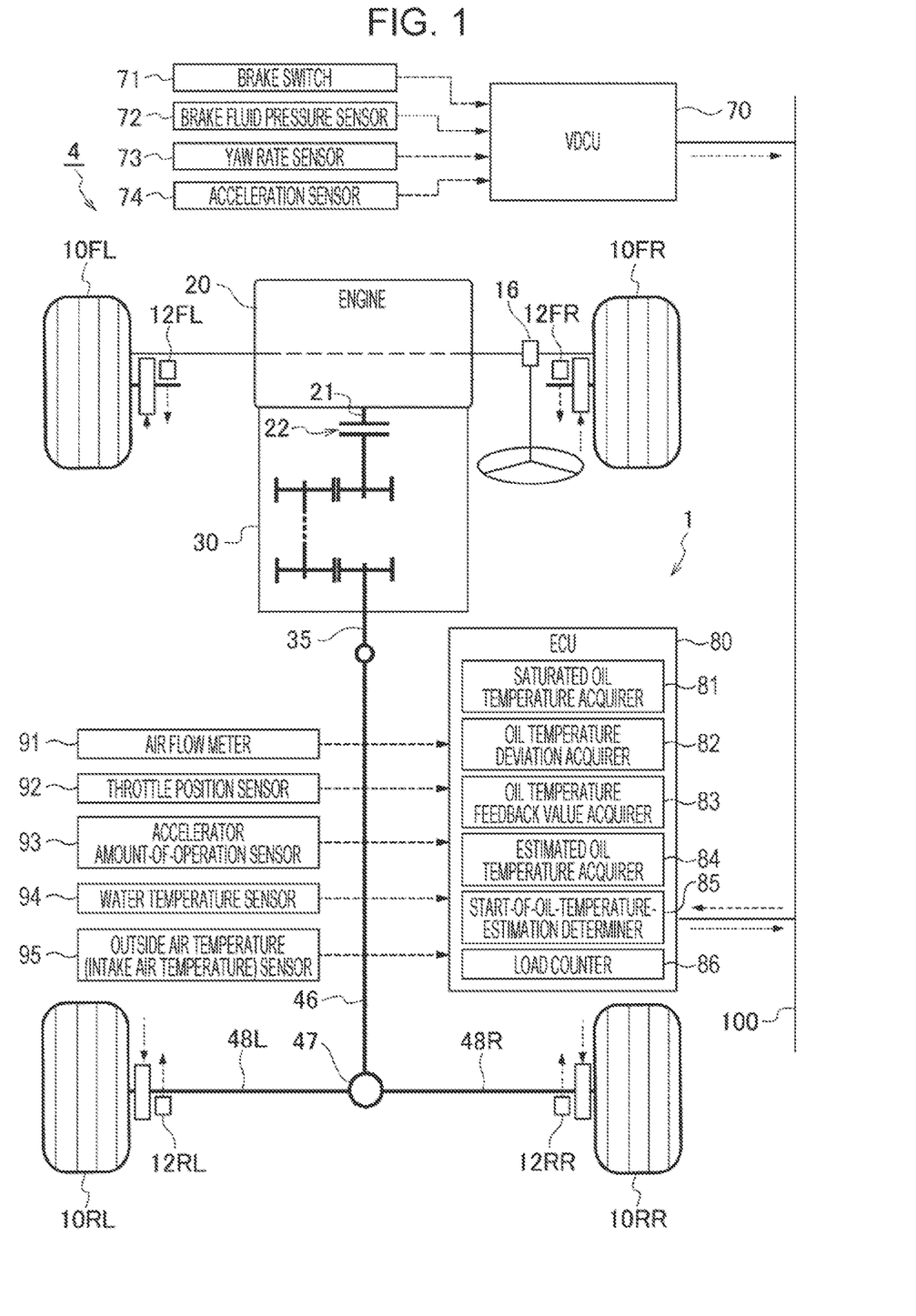
FIG. 1 is a block diagram illustrating the configuration of a rear-wheel-drive vehicle including an oil temperature estimation apparatus according to an embodiment.

The configuration of an oil temperature estimation apparatus 1 according to an embodiment will now be described with reference to FIG. 1. FIG. 1 is a block diagram illustrating the configuration of a rear-wheel-drive vehicle (hereinafter also simply referred to as "vehicle") 4 including the oil temperature estimation apparatus 1.

An engine 20 of any type may be used. For example, the engine 20 is a horizontally opposed four-cylinder gasoline engine for in-cylinder injection. Air taken into the engine 20 through an air cleaner (not illustrated) is squeezed by an electronically controlled throttle valve (hereinafter also simply referred to as "throttle valve") provided in an intake pipe, passes through an intake manifold, and is taken into each cylinder in the engine 20. The amount of air taken into the engine 20 through the air cleaner is detected by an air flow meter 91 (corresponds to an air-intake sensor described in aspects). In addition, a throttle position sensor 92 that detects the position of the throttle valve is provided in the throttle valve.

An injector that injects fuel is mounted to each cylinder of the engine 20. In addition, an ignition plug that lights up fuel-air mixture and an igniter built-in coil that applies high voltage to the ignition plug are mounted to each cylinder. In each cylinder of the engine 20, the fuel-air mixture of the intake air and the fuel injected by the injector is lighted up by the ignition plug to be fired. Exhaust gas after the firing is exhausted through an exhaust pipe.

A manual transmission (MT) 30 that converts driving force from the engine 20 and outputs the driving force subjected to the conversion is coupled to a crankshaft 21 of the engine 20 via, for example, a dry clutch 22. The manual transmission 30 is a transmission that manually performs the transmission operation and, for example, a transmission having concentric input-output shafts is used as the manual transmission 30. A known transmission, that is, a transmission in which a drive gear of each gear shift stage and a driven gear thereof are disposed on two shafts; a synchronization mechanism and a coupling sleeve, a shift fork, a striking rod, and so on, which operates the synchronization mechanism, are disposed next to the gears; and the synchronization mechanism, the coupling sleeve, the shift fork, the striking rod, and so on are coupled to a shift lever is capable of being used as the manual transmission 30. A transmission of another type, for example, a step automatic transmission (step AT), a continuously variable transmission (CVT), or a dual clutch transmission (DCT), may be used, instead of the manual transmission (MT) 30.

The driving force output from the engine 20, after being converted by the manual transmission 30, is transmitted from an output shaft 35 of the manual transmission 30 to left and right rear wheels 10RL and 10RR of the vehicle 4 via, for example, a propeller shaft 46, a rear differential 47, and left and right rear drive shafts 48L and 48R. The manual transmission 30, the propeller shaft 46, the rear differential 47, and the left and right rear drive shafts 48L and 48R correspond to a driving system described in the aspects.

In one example, the output shaft 35 of the manual transmission 30 is coupled to the propeller shaft 46 extending toward the rear side of the vehicle. The propeller shaft 46 is coupled to the rear differential 47. Accordingly, the driving force converted by the manual transmission 30 is transmitted from the output shaft 35 to the rear differential 47 via the propeller shaft 46.

The rear differential 47 is, for example, a bevel gear differential. The left rear drive shaft 48L and the right rear drive shaft 48R are coupled to the rear differential 47. The left rear wheel 10RL is coupled to the left rear drive shaft 48L. The right rear wheel 10RR is coupled to the right rear drive shaft 48R. Accordingly, the driving force from the rear differential 47 is transmitted to the left rear wheel 10RL via the left rear drive shaft 48L and is transmitted to the right rear wheel 10RR via the right rear drive shaft 48R.

A cam angle sensor for determining the cylinder of the engine 20 is mounted near a camshaft of the engine 20, in addition to the air flow meter 91 and the throttle position sensor 92 described above. A crank angle sensor that detects the position of the crankshaft 21 is mounted near the crankshaft 21 of the engine 20. These sensors are coupled to an engine control unit (hereinafter referred to as "ECU") 80 described below. In addition, various sensors including an accelerator amount-of-operation sensor 93 that detects the degree of depression of an accelerator pedal, a water temperature sensor 94 that detects the temperature of cooling water of the engine 20, and an outside air temperature (intake air temperature) sensor 95 that detects an outside air temperature (an engine intake air temperature) are also coupled to the ECU 80.

The ECU 80 includes a microprocessor that performs arithmetic operations, an electrically erasable programmable read-only memory (EEPROM) that stores programs and so on for causing the microprocessor to perform processes, a random access memory (RAM) that stores a variety of data including the results of the arithmetic operations, a backup RAM the content of storage of which is held by a battery, an input-output interface (I/F), and so on. In addition, the ECU 80 includes an injector driver that drives the injector, an output circuit that outputs an ignition signal, a motor driver that drives an electric motor that opens and closes the electronically controlled throttle valve, and so on.

In the ECU 80, the cylinder is determined from the output from the cam angle sensor and a crank angular velocity and an engine speed are calculated from the output from the crank angle sensor. In addition, in the ECU 80, a variety of information including an amount of intake air, the intake air temperature (the outside air temperature), the amount of operation of the accelerator pedal, an air fuel ratio of the fuel-air mixture, and the water temperature of the engine 20 is acquired based on detection signals input from the various sensors described above. The ECU 80 controls an amount of fuel injection, an ignition time, and the various devices including the throttle valve based on the acquired variety of information to comprehensively control the engine 20. The ECU 80, which comprehensively controls the engine 20, is coupled to a vehicle dynamics control unit (hereinafter referred to as "VDCU") 70 and so on so as to be capable of communication via a controller area network (CAN) 100.

The VDCU 70 includes a microprocessor that performs arithmetic operations, an EEPROM that stores programs and so on for causing the microprocessor to perform processes, a RAM that stores a variety of data including the results of the arithmetic operations, a backup RAM the content of storage of which is held by a battery, an input-output I/F, and so on.

A brake switch 71 that detects whether a brake pedal is depressed and a brake fluid pressure sensor 72 that detects mater cylinder pressure (brake oil pressure) of a brake actuator are coupled to the VDCU 70. In addition, four wheel speed sensors 12FL, 12FR, 12RL, and 12RR (correspond to a vehicle speed sensor described in the aspects), a yaw rate sensor 73, an acceleration sensor 74, a steering angle sensor 16, and so on are coupled to the VDCU 70.

The wheel speed sensors 12FL, 12FR, 12RL, and 12RR detect the rotation states of the wheels 10FL, 10FR, 10RL, and 10RR, respectively, by detecting the rotation of gears mounted to the centers of the wheels 10FL, 10FR, 10RL, and 10RR with a magnetic pickup or the like. The yaw rate sensor 73 detects the rotation angular velocity (yaw rate) around the vertical axis passing through the center of gravity of the vehicle 4. The acceleration sensor 74 detects the acceleration exerted on the vehicle 4. The steering angle sensor 16 detects the rotation angle of a pinion shaft to detect the steering angles of the front wheels 10FL and 10FR, which are steering wheels.

The VDCU 70 drives the brake actuator in accordance with the amount of operation (the amount of depression) of the brake pedal to brake the vehicle 4. The VDCU 70 detects the vehicle behavior with the various sensors (for example, the wheel speed sensors 12FL, 12FR, 12RL, and 12RR, the steering angle sensor 16, the yaw rate sensor 73, the acceleration sensor 74, and so on) and suppresses sideslip through, for example, brake control by automatic pressurization to ensure the stability of the vehicle during turning.

The VDCU 70 transmits the yaw rate, the steering angle, braking information about the brake switch 71, the brake fluid pressure, and so on (brake operation information), the wheel speed (vehicle speed), the vehicle acceleration, and so on, which are detected, to the ECU 80 via the CAN 100.

In particular, the ECU 80 has a function to estimate the oil temperature of the driving system without using (providing) the oil temperature sensor that detects the oil temperature. Accordingly, the ECU 80 functionally includes a saturated oil temperature acquirer 81, an oil temperature deviation acquirer 82, an oil temperature feedback value acquirer 83, an estimated oil temperature acquirer 84, a start-of-oil-temperature-estimation determiner 85, and a load counter 86. In the ECU 80, the programs stored in the EEPROM and so on are executed by the microprocessor to realize the functions of the saturated oil temperature acquirer 81, the oil temperature deviation acquirer 82, the oil temperature feedback value acquirer 83, the estimated oil temperature acquirer 84, the start-of-oil-temperature-estimation determiner 85, and the load counter 86.

The start-of-oil-temperature-estimation determiner calculates an engine load input into the driving system based on an amount of engine intake air (air intake) Ga. The startof-oil-temperature-estimation determiner 85 increments the load counter 86 if the engine load is in a high load area in which the value of the engine load is higher than or equal to a predetermined value (is continued for a predetermined time) and decrements the load counter 86 if the engine load is in a low load area in which the value of the engine load is lower than the predetermined value (is continued for a predetermined time). Here, the load counter 86 is a counter that integrates the engine loads input into the driving system. The increment and decrement values of the load counter 86 are set in accordance with, for example, the amount of engine intake air (air intake) Ga. The value of the load counter 86 (a counter value) is desirably guarded so that the value of the load counter 86 (the counter value) does not have a negative value.

The start-of-oil-temperature-estimation determiner starts oil temperature estimation if the value of the load counter 86 (the counter value) is higher than or equal to a predetermined start-of-oil-temperature-estimation threshold value (that is, it is determined that the vehicle 4 is in a high temperature state due to heat input into the driving system (the oil temperature). In one example, the start-of-oil-temperature-estimation determiner 85 supplies, for example, a start-of-oil-temperature-estimation request (flag) to the saturated oil temperature acquirer 81, the oil temperature deviation acquirer 82, the oil temperature feedback value acquirer 83, and the estimated oil temperature acquirer 84. The predetermined start-of-oil-temperature-estimation threshold value is set through adaptation or the like.

Since the oil temperature of the driving system is not overheated even if the vehicle speed is increased to a high value because of, for example, downhill, it is possible to perform high temperature protection of the driving system (for example, vehicle speed restriction) in a state in which the high load is continuously applied to the driving system by starting the oil temperature estimation of the driving system if the counter value (the integrated value) of the load counter 86 is higher than or equal to the predetermined start-of-oil-temperature-estimation threshold value, as described above.

The estimated oil temperature acquirer 84 acquires an estimated oil temperature initial value Te(ini) based on an outside air temperature (engine intake air temperature) Ta at start (before start) of the oil temperature estimation. The estimated oil temperature initial value is an initial used for estimating the oil temperature. In one example, a table (an estimated oil temperature initial value table) in which the relationship between the outside air temperature (engine intake air temperature) Ta and the estimated oil temperature initial value Te(ini) is defined is stored in advance in the EEPROM or the like of the ECU 80. In the ECU (the estimated oil temperature acquirer 84), the estimated oil temperature initial value table is searched based on the detected outside air temperature (engine intake air temperature) Ta to acquire the estimated oil temperature initial value Te(ini).

Figure 6:
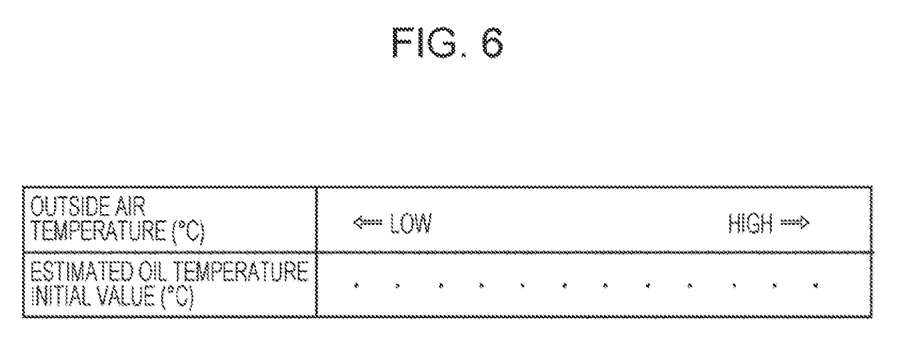
FIG. 6 is a diagram illustrating an example of an estimated oil temperature initial value table.

An example of the estimated oil temperature initial value table is illustrated in FIG. 6. Referring to FIG. 6, the horizontal axis represents the outside air temperature (engine intake air temperature) Ta (° C.). In the estimated oil temperature initial value table, the estimated oil temperature initial value Te(ini) is set to be increased as the outside air temperature (engine intake air temperature) Ta is increased. Data in the estimated oil temperature initial value table is capable of being acquired through, for example, adaptation or simulation. Setting the initial value at start of the oil temperature estimation in accordance with the outside air temperature (engine intake air temperature) Ta enables the high temperature protection of the driving system (for example, the vehicle speed restriction) to be performed in a desirable area through adaptation of the table data. Any fail-safe (F/S) setting may be used at the time of abnormality of the outside air temperature (intake air temperature) sensor 95.

The acquired estimated oil temperature initial value Te(ini) is supplied to the oil temperature deviation acquirer 82. The oil temperature deviation acquirer 82 uses the estimated oil temperature initial value Te(ini) as an estimated oil temperature previous value Te(n−1) at start of the oil temperature estimation (described in detail below). The estimated oil temperature previous value may be a last value of the estimated oil temperature.

Figure 3:
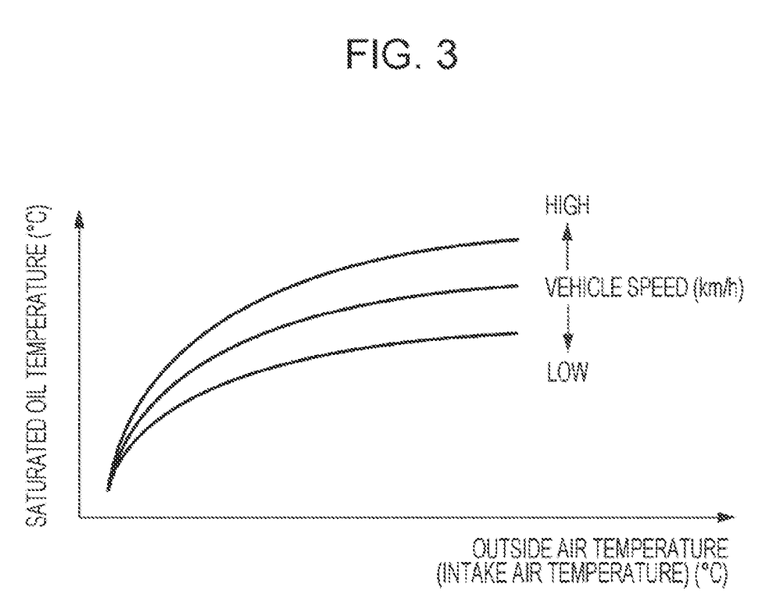
FIG. 3 is a graph illustrating the relationship between an outside air temperature (an intake air temperature), a vehicle speed, and a saturated oil temperature.

The saturated oil temperature acquirer 81 acquires a saturated oil temperature (last oil temperature) Tfin in a running state of the vehicle based on, for example, the outside air temperature (engine intake air temperature) Ta and a vehicle speed Vcar (that is, based on the running state of the vehicle at least including the vehicle speed). During acceleration or during running at a high vehicle speed, the oil temperature of the driving system is increased due to the influence of the heat of the engine 20 or a high rotation speed. In contrast, when the running state at a high vehicle speed is continued for a certain time or longer, the increase in the oil temperature (heating) is balanced with decrease in the oil temperature (cooling) due to air resistance to be in a state in which the oil temperature is saturated (the saturated oil temperature Tfin). Accordingly, the saturated oil temperature Tfin of the driving system is changed (varied) in a logarithmic function curve in accordance with the vehicle speed Vcar and the outside air temperature (engine intake air temperature) Ta, as illustrated in FIG. 3.

How to acquire the saturated oil temperature Tfin will now be described. For example, a map (a saturated oil temperature map) in which the relationship between the outside air temperature (engine intake air temperature) Ta, the vehicle speed Vcar, and the saturated oil temperature Tfin is defined is stored in the EEPROM or the like of the ECU 80. The saturated oil temperature map is searched based on the outside air temperature (engine intake air temperature) Ta and the vehicle speed Vcar to acquire the saturated oil temperature Tfin.

Figure 4:
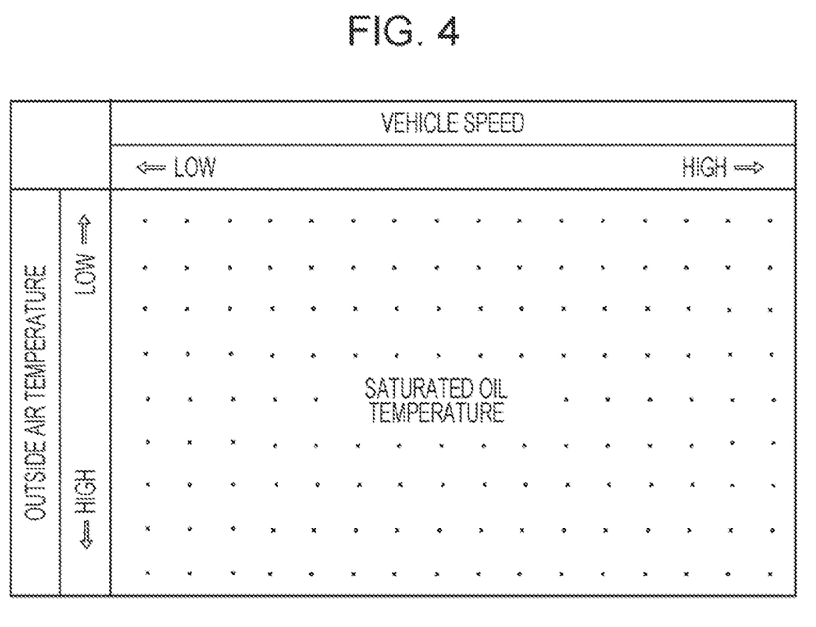
FIG. 4 is a diagram illustrating an example of a saturated oil temperature map.

An example of the saturated oil temperature map is illustrated in FIG. 4. Referring to FIG. 4, the horizontal axis represents the vehicle speed Vcar (km/h) and the vertical axis represents the outside air temperature (engine intake air temperature) Ta (° C.). In the saturated oil temperature map, the saturated oil temperature Tfin (° C.) is set for each combination (each grid point) of the outside air temperature (engine intake air temperature) Ta and the vehicle speed Vcar. In the saturated oil temperature map, the saturated oil temperature Tfin is set to be increased as the outside air temperature (engine intake air temperature) Ta is increased and the saturated oil temperature Tfin is set to be increased as the vehicle speed Vcar is increased. Data in the saturated oil temperature map is capable of being acquired through, for example, adaptation or simulation. The acquired saturated oil temperature Tfin is supplied to the oil temperature deviation acquirer 82.

The oil temperature deviation acquirer 82 calculates an oil temperature deviation Tdif between the saturated oil temperature Tfin and the estimated oil temperature previous value Te(n−1). As described above, there is an area in which the oil temperature of the driving system is saturated depending on the outside air temperature (engine intake air temperature) Ta and the vehicle speed Vcar and the increase and the decrease of the oil temperature are varied depending on the difference in temperature from the oil temperature at the saturation.

In one example, the oil temperature deviation acquirer 82 calculates the oil temperature deviation Tdif according to Equation (1):

$$\text{Oil temperature deviation } Tdif = \text{Saturated oil temperature } Tfin - \text{Estimated oil temperature previous value } Te(n-1) \quad (1)$$

At start of the oil temperature estimation, the oil temperature deviation acquirer 82 uses the estimated oil temperature initial value Te(ini) as the estimated oil temperature previous value Te(n−1). The acquired oil temperature deviation Tdif is supplied to the oil temperature feedback value acquirer 83.

The oil temperature feedback value acquirer 83 acquires an oil temperature feedback value Tfb based on the oil temperature deviation Tdif and the vehicle speed Vcar. Since the curve of the variation in temperature with respect to the vehicle speed is uniquely determined, the oil temperature feedback value acquirer 83 acquires the oil temperature feedback value Tfb, that is, the amount of feedback of increase or decrease of the estimated oil temperature based on the oil temperature deviation Tdif and the vehicle speed Vcar.

How to acquire the oil temperature feedback value Tfb will now be described. A map (an oil temperature feedback value map) in which the relationship between the oil temperature deviation Tdif, the vehicle speed Vcar, and the oil temperature feedback value Tfb is defined is stored in the EEPROM or the like of the ECU 80. The oil temperature feedback value map is searched based on the oil temperature deviation Tdif and the vehicle speed Vcar to acquire the oil temperature feedback value Tfb.

Figure 5:
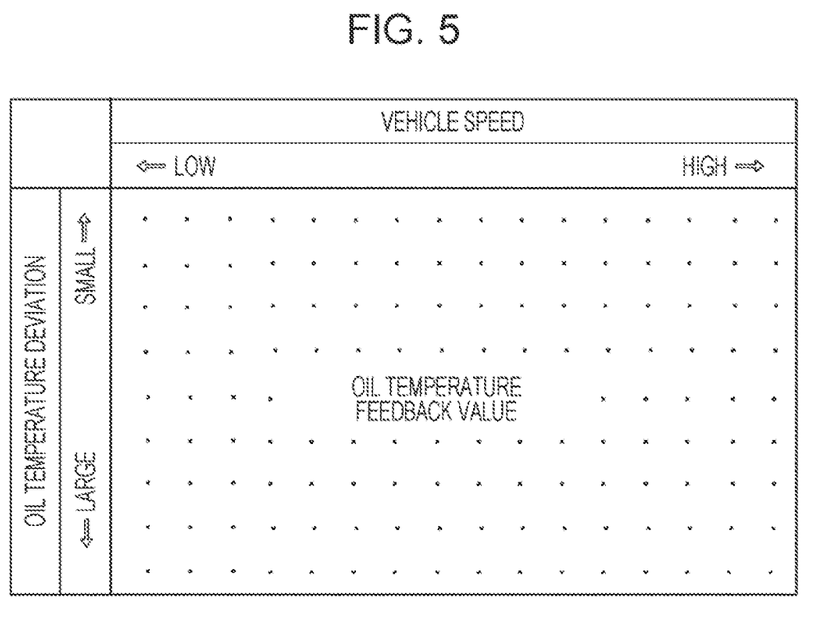
FIG. 5 is a diagram illustrating an example of an oil temperature feedback value map.

An example of the oil temperature feedback value map is illustrated in FIG. 5. Referring to FIG. 5, the horizontal axis represents the vehicle speed Vcar (km/h) and the vertical axis represents the oil temperature deviation Tdif (° C.). In the oil temperature feedback value map, the oil temperature feedback value (° C.) is set for each combination (each grid point) of the oil temperature deviation Tdif and the vehicle speed Vcar. Data in the oil temperature feedback value map is capable of being acquired through, for example, adaptation or simulation. The acquired oil temperature feedback value Tfb is supplied to the estimated oil temperature acquirer 84.

The estimated oil temperature acquirer 84 acquires an estimated oil temperature current value Te(n) based on the estimated oil temperature previous value Te(n−1) and the oil temperature feedback value Tfb. The estimated oil temperature current value may be a value of the oil temperature that is currently estimated and estimated one time after the estimated oil temperature previous value Te(n−1), that is, the last value of the estimated oil temperature. In one example, the estimated oil temperature acquirer 84 calculates the estimated oil temperature current value Te(n) according to Equation (2):

$$\text{Estimated oil temperature current value } Te(n) = \text{Estimated oil temperature previous value } Te(n-1) + \text{Oil temperature feedback value } Tfb \quad (2)$$

At start of the oil temperature estimation, the estimated oil temperature acquirer 84 uses the estimated oil temperature initial value Te(ini) as the estimated oil temperature previous value Te(n−1).

The ECU 80 performs the high temperature protection (overheat protection) of the driving system using the acquired estimated oil temperature current value Te(n). In one example, if an estimated oil temperature Te is higher than or equal to a predetermined temperature, the ECU 80 restricts (decreases) the output from the engine by decreasing a target throttle position (that is, squeezing the throttle) to restrict (decrease) the vehicle speed. As a result, the oil temperature of the driving system is decreased (that is, the high oil temperature is prevented). Since the oil temperature of the driving system depends on the vehicle speed, restricting the vehicle speed enables the oil temperature of the driving system to be decreased.

Figure 2:
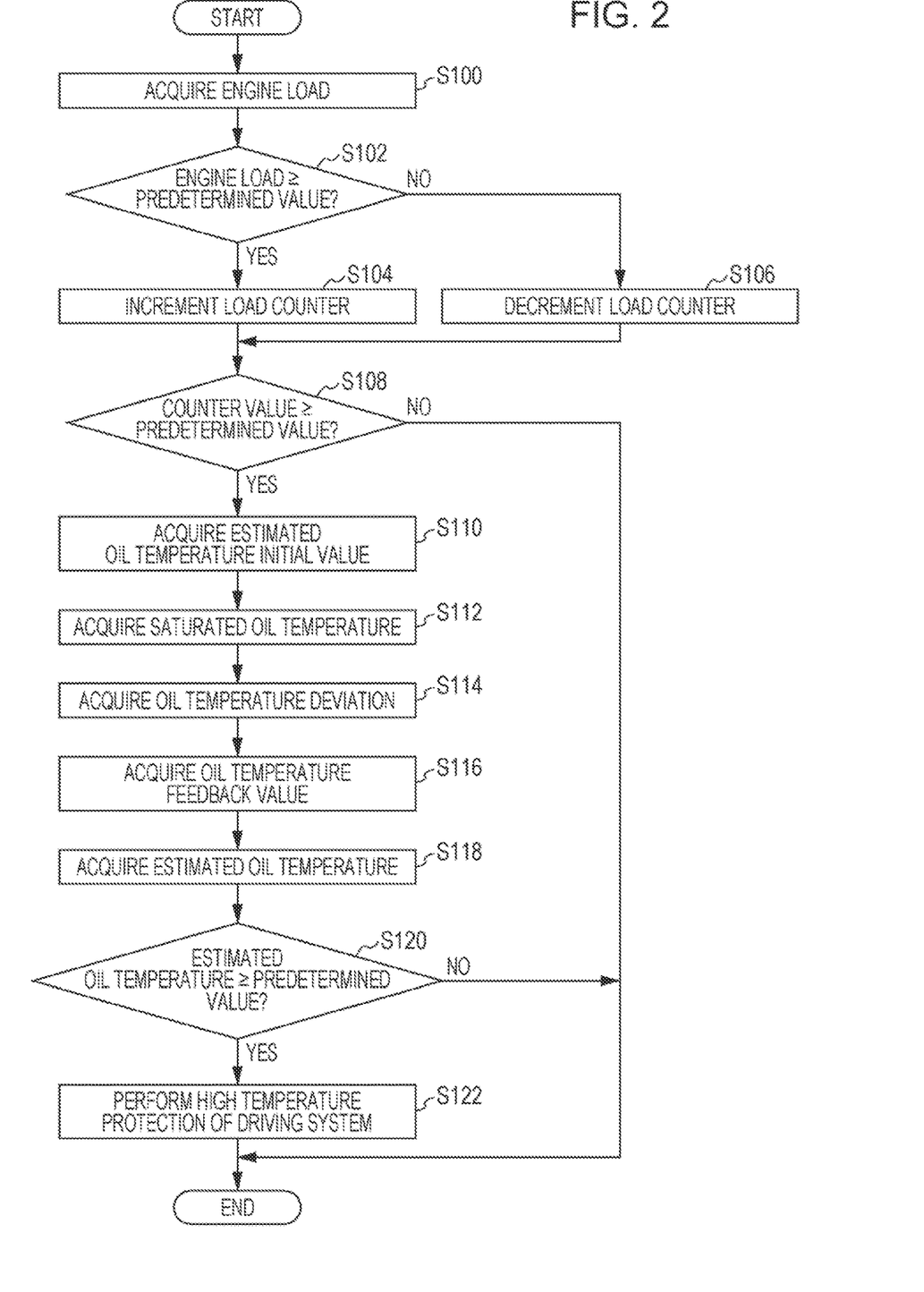
FIG. 2 is a flowchart illustrating an oil temperature estimation process (an oil temperature estimation method) performed by the oil temperature estimation apparatus according to the embodiment.

An operation of the oil temperature estimation apparatus 1 (an oil temperature estimation method) will now be described with reference to FIG. 2. FIG. 2 is a flowchart illustrating an oil temperature estimation process (the oil temperature estimation method) performed by the oil temperature estimation apparatus 1. The process in FIG. 2 is repeatedly performed at a certain timing mainly by the ECU Referring to FIG. 2, in Step S100, the ECU 80 acquires the engine load based on the amount of engine intake air. In Step S102, the ECU 80 determines whether the engine load is higher than or equal to a predetermined value. If the engine load is in the high load area in which the value of the engine load is higher than or equal to the predetermined value (YES in Step S102), in Step S104, the load counter 86 is incremented. Then, the process goes to Step S108. If the engine load is in the low load area in which the value of the engine load is lower than the predetermined value (NO in Step S102), in Step S106, the load counter 86 is decremented. Then, the process goes to Step S108.

In Step S108, the ECU 80 determines whether the value of the load counter 86 (the counter value) is higher than or equal to the predetermined start-of-oil-temperature-estimation threshold value. If the value of the load counter 86 is higher than or equal to the predetermined start-of-oil-temperature-estimation threshold value (YES in Step S108), the oil temperature estimation is started. Then, the process goes to Step S110. If the value of the load counter 86 is lower than the predetermined start-of-oil-temperature-estimation threshold value (NO in Step S108), the process illustrated in FIG. 2 is terminated.

In Step S110, the ECU 80 acquires the estimated oil temperature initial value Te(ini) based on the outside air temperature (engine intake air temperature) Ta. Since the method of acquiring the estimated oil temperature initial value Te(ini) is described above, a detailed description of the method is omitted herein.

In Step S112, the ECU 80 acquires the saturated oil temperature Tfin based on the outside air temperature (engine intake air temperature) Ta and the vehicle speed Vcar (a saturated oil temperature acquiring step). Since the method of acquiring the saturated oil temperature Tfin is described above, a detailed description of the method is omitted herein.

In Step S114, the ECU 80 acquires the oil temperature deviation Tdif between the saturated oil temperature Tfin and the estimated oil temperature previous value Te(n−1) (an oil temperature deviation acquiring step).

As described above, at start of the oil temperature estimation, the estimated oil temperature initial value Te(ini) is used as the estimated oil temperature previous value Te(n−1).

In Step S116, the ECU 80 acquires the oil temperature feedback value Tfb based on the oil temperature deviation Tdif and the vehicle speed Vcar (an oil temperature feedback value acquiring step). Since the method of acquiring the oil temperature feedback value Tfb is described above, a detailed description of the method is omitted herein.

In Step S118, the ECU 80 acquires the estimated oil temperature current value Te(n) based on the estimated oil temperature previous value Te(n−1) and the oil temperature feedback value Tfb (an estimated oil temperature acquiring step). Since the method of acquiring the estimated oil temperature current value Te(n) is described above, a detailed description of the method is omitted herein. As described above, at start of the oil temperature estimation, the estimated oil temperature initial value Te(ini) is used as the estimated oil temperature previous value Te(n−1).

In Step S120, the ECU 80 determines whether the estimated oil temperature current value Te(n) is higher than or equal to a predetermined value. If the estimated oil temperature current value Te(n) is higher than or equal to the predetermined value (YES in Step S120), the process goes to Step S122. If the estimated oil temperature current value Te(n) is lower than the predetermined value (NO in Step S120), the process illustrated in FIG. 2 is terminated.

In Step S122, the throttle position is decreased to restrict (regulate) the vehicle speed. That is, the high temperature protection (the overheat protection) of the driving system is performed. Then, the process illustrated in FIG. 2 is terminated.

As described above, according to the present embodiment, the saturated oil temperature in the running state is acquired based on the running state of the vehicle including the vehicle speed, the oil temperature deviation between the saturated oil temperature and the estimated oil temperature previous value is acquired, the oil temperature feedback value is acquired based on the oil temperature deviation and the vehicle speed, and the estimated oil temperature current value is acquired based on the estimated oil temperature previous value and the oil temperature feedback value. Accordingly, it is possible to estimate the oil temperature of the driving system without using (providing) the oil temperature sensor that detects the oil temperature.

Since the saturated oil temperature is acquired based on the outside air temperature and the vehicle speed according to the present embodiment, it is possible to set the saturated oil temperature in accordance with the outside air temperature and the vehicle speed.

According to the present embodiment, the estimated oil temperature initial value is acquired based on the outside air temperature and the estimated oil temperature initial value is used as the estimated oil temperature previous value at start of the oil temperature estimation. Accordingly, it is possible to appropriately set the estimated oil temperature initial value in accordance with the outside air temperature.

According to the present embodiment, the engine load is acquired based on the amount of engine intake air. The load counter 86 is incremented if the engine load is in the high load area in which the value of the engine load is higher than or equal to a predetermined value and the load counter 86 is decremented if the engine load is in the low load area in which the value of the engine load is lower than the predetermined value. If the value of the load counter 86 (the counter value) is higher than or equal to the predetermined start-of-oil-temperature-estimation threshold value, the oil temperature estimation is started.

Accordingly, it is possible to start the oil temperature estimation when the driving system is in the high load state and the oil temperature is increased (at a high temperature) that is, when the ECU 80 predicts that the high temperature protection (the overheat protection) of the driving system is to be performed.

Although the embodiment of the disclosure is described above, the disclosure is not limited to the above embodiment and various modifications may be made. For example, although the case is exemplified in which the vehicle 4 including the manual transmission 30 as the driving system is applied in the above embodiment, a vehicle (driving system) including, for example, a step automatic transmission (step AT), a continuously variable transmission (CVT), or a dual clutch transmission (DCT), or the like, instead of the manual transmission 30, may be applied.

Although the case is exemplified in which the disclosure is applied to the rear-wheel-drive vehicle (front-engine rear-drive (FR) vehicle) 4 in the above embodiment, the disclosure is applicable to, for example, an all-wheel-drive vehicle (AWD vehicle).

Although the vehicle 4 using the engine 20 as a driving force source is exemplified in the above embodiment, a vehicle using an electric motor or the like, instead of or in addition to the engine 20, as the driving force source may be applied. In other words, the disclosure is applicable to, for example, a hybrid electric vehicle (HEV), a plug-in hybrid electric vehicle (PHEV), an electric vehicle (EV), or a fuel cell vehicle (FCV). In this case, motor load is considered, instead of or in addition to the engine load, in the integration of the load counter 86.

The system configuration is not limited to the configuration described in the above embodiment. Although, for example, the configuration is adopted in which the ECU 80 controlling the engine 20 is coupled to the VDCU 70 via the CAN 100 (so as to be capable of communication) in the above embodiment, a different system configuration may be adopted. For example, a configuration may be adopted in which the wheel speed sensor (vehicle speed sensor) 12 is coupled to the ECU 80.

The ECU 80 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the ECU 80 including the saturated oil temperature acquirer 81, the oil temperature deviation acquirer 82, the oil temperature feedback value acquirer 83, the estimated oil temperature acquirer 84, the start-of-oil-temperature-estimation determiner 85, and the load counter 86. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An oil temperature estimation apparatus configured to estimate an oil temperature and perform high temperature protection of a driving system of a vehicle, the oil temperature estimation apparatus comprising:
 a vehicle speed sensor configured to detect a vehicle speed of the vehicle;
 an outside air temperature sensor configured to detect an outside air temperature;

one or more processors and one or more memories storing instructions configured to cause the one or more processors to:
acquire an estimated oil temperature initial value;
use, at a start of estimating the oil temperature, the estimated oil temperature initial value as an estimated oil temperature previous value;
acquire a saturated oil temperature in a running state of the vehicle based on the running state and on the outside air temperature, the running state at least including the vehicle speed;
acquire an oil temperature deviation between the saturated oil temperature and the estimated oil temperature previous value;
acquire an oil temperature feedback value based on the oil temperature deviation and the vehicle speed;
acquire an estimated oil temperature current value based on the estimated oil temperature previous value and the oil temperature feedback value, the estimated oil temperature current value including a current value of the estimated oil temperature that is estimated one time after the last value of the estimated oil temperature, wherein the estimated oil temperature current value is used as the estimated oil temperature previous value one time after the current value of the estimated temperature in a next estimation of the oil temperature; and
in response to the estimated oil temperature current value being higher than or equal to a predetermined value, restrict the vehicle speed of the vehicle.

2. The oil temperature estimation apparatus according to claim 1, further comprising:
an outside air temperature sensor configured to detect an outside air temperature,
wherein the one or more memories store instructions configured to cause the one or more processors to acquire the saturated oil temperature based on the outside air temperature and the vehicle speed.

3. The oil temperature estimation apparatus according to claim 2,
wherein the estimated oil temperature initial value is acquired based on the outside air temperature, the estimated oil temperature initial value being an initial used for estimating the oil temperature.

4. The oil temperature estimation apparatus according to claim 3, further comprising:
an air-intake sensor configured to detect an amount of engine intake air of the vehicle; and
the one or more processors comprises a load counter configured to integrate an engine load that is input into the driving system, wherein
the one or more memories store instructions configured to cause the one or more processors to acquire the engine load based on the amount of engine intake air, increment the load counter when the engine load is in a high load area in which a value of the engine load is higher than or equal to a predetermined value and decrement the load counter when the engine load is in a low load area in which the value of the engine load is lower than the predetermined value, and start estimating the oil temperature when the value of the load counter is higher than or equal to a predetermined start-of-oil-temperature-estimation threshold value.

5. The oil temperature estimation apparatus according to claim 1, wherein the vehicle speed of the vehicle is restricted by decreasing a target throttle position of a throttle of the vehicle.

6. An oil temperature estimation method of estimating an oil temperature and performing high temperature protection of a driving system of a vehicle, the oil temperature estimation method comprising:
detecting an outside air temperature using with an outside air temperature sensor;
detecting a vehicle speed of the vehicle with a vehicle speed sensor;
acquiring an estimated oil temperature initial value;
using, at a start of estimating the oil temperature, the estimated oil temperature initial value as an estimated oil temperature previous value;
acquiring a saturated oil temperature based on the outside air temperature and the vehicle speed;
acquiring an oil temperature deviation between the saturated oil temperature and the estimated oil temperature previous value;
acquiring an oil temperature feedback value based on the oil temperature deviation and the vehicle speed;
acquiring an estimated oil temperature current value based on the estimated oil temperature previous value and the oil temperature feedback value, the estimated oil temperature current value including a current value of the estimated oil temperature that is estimated one time after the last value of the estimated oil temperature, wherein the estimated oil temperature current value is used as the estimated oil temperature previous value one time after the current value of the estimated temperature in a next estimation of the oil temperature; and
in response to the estimated oil temperature current value being higher than or equal to a predetermined value, restricting the vehicle speed of the vehicle.

7. The oil temperature estimation method according to claim 6, wherein the vehicle speed of the vehicle is restricted by decreasing a target throttle position of a throttle of the vehicle.

8. An oil temperature estimation apparatus configured to estimate an oil temperature and perform high temperature protection of a driving system of a vehicle, the oil temperature estimation apparatus comprising:
a vehicle speed sensor configured to detect a vehicle speed of the vehicle;
an outside air temperature sensor configured to detect an outside air temperature; and
circuitry configured to:
acquire an estimated oil temperature initial value;
use, at a start of estimating the oil temperature, the estimated oil temperature initial value as an estimated oil temperature previous value;
acquire a saturated oil temperature in a running state of the vehicle at least including the vehicle speed based on the running state and on the outside air temperature, the running state at least including the vehicle speed;
acquire an oil temperature deviation between the saturated oil temperature and the estimated oil temperature previous value;
acquire an oil temperature feedback value based on the oil temperature deviation and the vehicle speed;
acquire an estimated oil temperature current value based on the estimated oil temperature previous value and the oil temperature feedback value, the estimated oil temperature current value including a current value of the estimated oil temperature that is estimated one time after the last value of the estimated oil temperature, wherein the estimated oil temperature current value is used as the estimated oil temperature previous value one time after the current value of the estimated temperature in a next estimation of the oil temperature; and in response to the estimated oil temperature current value being higher than or equal to a predetermined value, restrict the vehicle speed of the vehicle.

9. The oil temperature estimation apparatus according to claim 8, wherein the vehicle speed of the vehicle is restricted by decreasing a target throttle position of a throttle of the vehicle.

* * * * *